(12) United States Patent
Tang et al.

(10) Patent No.: US 9,473,325 B2
(45) Date of Patent: Oct. 18, 2016

(54) CHANNEL ESTIMATION METHOD AND ASSOCIATED DEVICE FOR ESTIMATING DATA CHANNEL OF DATA RESOURCE ELEMENT OF PHYSICAL RESOURCE BLOCK FOR OFDM SYSTEM

(71) Applicant: MediaTek Singapore Pte. Ltd., Singapore (SG)

(72) Inventors: Hengsheng Tang, Beijing (CN); Jianxuan Du, Shaanxi (CN); Songsong Sun, Tustin, CA (US); Ganning Yang, Irvine, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 206 days.

(21) Appl. No.: 14/295,345

(22) Filed: Jun. 4, 2014

(65) Prior Publication Data
US 2015/0358181 A1    Dec. 10, 2015

(51) Int. Cl.
*H04L 25/02* (2006.01)
*H04L 5/00* (2006.01)

(52) U.S. Cl.
CPC ......... *H04L 25/0202* (2013.01); *H04L 5/0005* (2013.01); *H04L 5/0048* (2013.01); *H04L 25/0204* (2013.01); *H04L 25/0228* (2013.01)

(58) Field of Classification Search
CPC ....... H04B 7/0413; H04L 1/06; H04L 5/005; H04L 5/0007; H04L 5/0044; H04L 5/0048; H04L 5/0051; H04L 5/0053; H04L 25/0202; H04L 25/0204; H04L 25/0208; H04L 25/0224; H04L 25/0242; H04L 25/03248
See application file for complete search history.

(56) References Cited

U.S. PATENT DOCUMENTS

2011/0310831 A1    12/2011    Bhattad

FOREIGN PATENT DOCUMENTS

EP    2 584 855 A1    4/2013
WO    2013191503 A1    12/2013

*Primary Examiner* — Alpus H Hsu
*Assistant Examiner* — Dharmesh Patel
(74) *Attorney, Agent, or Firm* — Winston Hsu; Scott Margo

(57) ABSTRACT

A channel estimation method estimates a data channel of a data resource element of a physical resource block in a time-frequency domain. The method includes: utilizing a detection circuit to perform a first physical resource block bundling detection in a first direction of the time-frequency domain to detect if at least one neighboring physical resource block is allowed to be bundled with the physical resource block, and accordingly generating a first physical resource block bundling detection result; determining a physical resource block processing range according to at least the first physical resource block bundling detection result, wherein at least the physical resource block is included in the physical resource block processing range; obtaining a plurality of pilot channels for pilot resource elements in the physical resource block processing range; and estimating the data channel of the data resource element according to the pilot channels.

10 Claims, 8 Drawing Sheets

CHANNEL ESTIMATION METHOD AND ASSOCIATED DEVICE FOR ESTIMATING DATA CHANNEL OF DATA RESOURCE ELEMENT OF PHYSICAL RESOURCE BLOCK FOR OFDM SYSTEM

BACKGROUND

The present invention relates to a channel estimation method, and more particularly, to a channel estimation method and associated device capable of optimizing the performance of estimating a data channel of a data resource element even if the physical resource block (PRB) bundling information is unknown at the receiver.

In communication systems such as the third Generation Partnership Project (3GPP) Long Term Evolution (LTE) (hereinafter "LTE"), variations in phase and amplitude are introduced into signals transmitted along the channel. These variations can be realized as the channel response. The channel response is usually frequency-dependent and time-dependent. The channel degradation of the received signal can be compensated if the receiver can correctly detect the channel response. Detection of the channel response is called channel estimation. In the LTE system, a number of resource elements (REs) are chosen to carry pilot signals for channel estimation purposes. The pilot signals contain useful information which facilitates the channel estimator to detect the channel response of a specific frequency and time. The resource elements carrying the pilot signals are also called pilot resource elements.

Due to increasing data traffic involved in wireless communication techniques, how to optimize estimation for data channels of the data resource elements has become an important issue. Estimating the data channel of data resource elements (REs) is important for the recovery of the transmitted information data at the receiver, to thereby reach high receiving quality.

In the 3GPP specification, a plurality of neighboring pilot resource elements in the time-frequency domain (e.g. the OFDM system) may be utilized to jointly perform channel estimation for the data resource element in order to improve the channel estimation performance if those pilot resource elements are correlated. The receiver, such as user equipment (UE), may not be able to tell which pilot resource elements that neighbor the data resource element are helpful or correlated, however. How to optimize the channel estimation performance when there is limited information at the receiver is therefore an issue in the field which requires a solution.

There is a need for a novel channel estimation method and associated device to improve the channel estimation performance, to thereby overcome issues existing in the prior art.

SUMMARY

An embodiment of the present invention provides a channel estimation method for estimating a data channel of a data resource element of a physical resource block (PRB) in a time-frequency domain. The channel estimation method comprises: utilizing a detection circuit to perform a first PRB bundling detection in a first direction of the time-frequency domain to detect if at least one neighboring PRB is allowed to be bundled with the PRB, and accordingly generating a first PRB bundling detection result; determining a PRB processing range according to at least the first PRB bundling detection result, wherein at least the PRB is included in the PRB processing range; obtaining a plurality of pilot channels for pilot resource elements in the PRB processing range; and estimating the data channel of the data resource element according to the pilot channels.

Another embodiment of the present invention provides a channel estimation device for estimating a data channel of a data resource element of a physical resource block (PRB) in a time-frequency domain. The channel estimation device comprises a detection circuit, a range detector, a pilot channel estimator and a data channel estimator. The detection circuit is arranged to perform a first PRB bundling detection in a first direction of the time-frequency domain to detect if at least one neighboring PRB is allowed to be bundled with the PRB, and accordingly generate a first PRB bundling detection result. The range detector is arranged to determine a PRB processing range according to at least the first PRB bundling detection result, wherein at least the PRB is included in the PRB processing range. The pilot channel estimator is arranged to obtain a plurality of pilot channels for pilot resource elements in the PRB processing range. The data channel estimator is arranged to estimate the data channel of the data resource element according to the pilot channels.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

Figure 1:
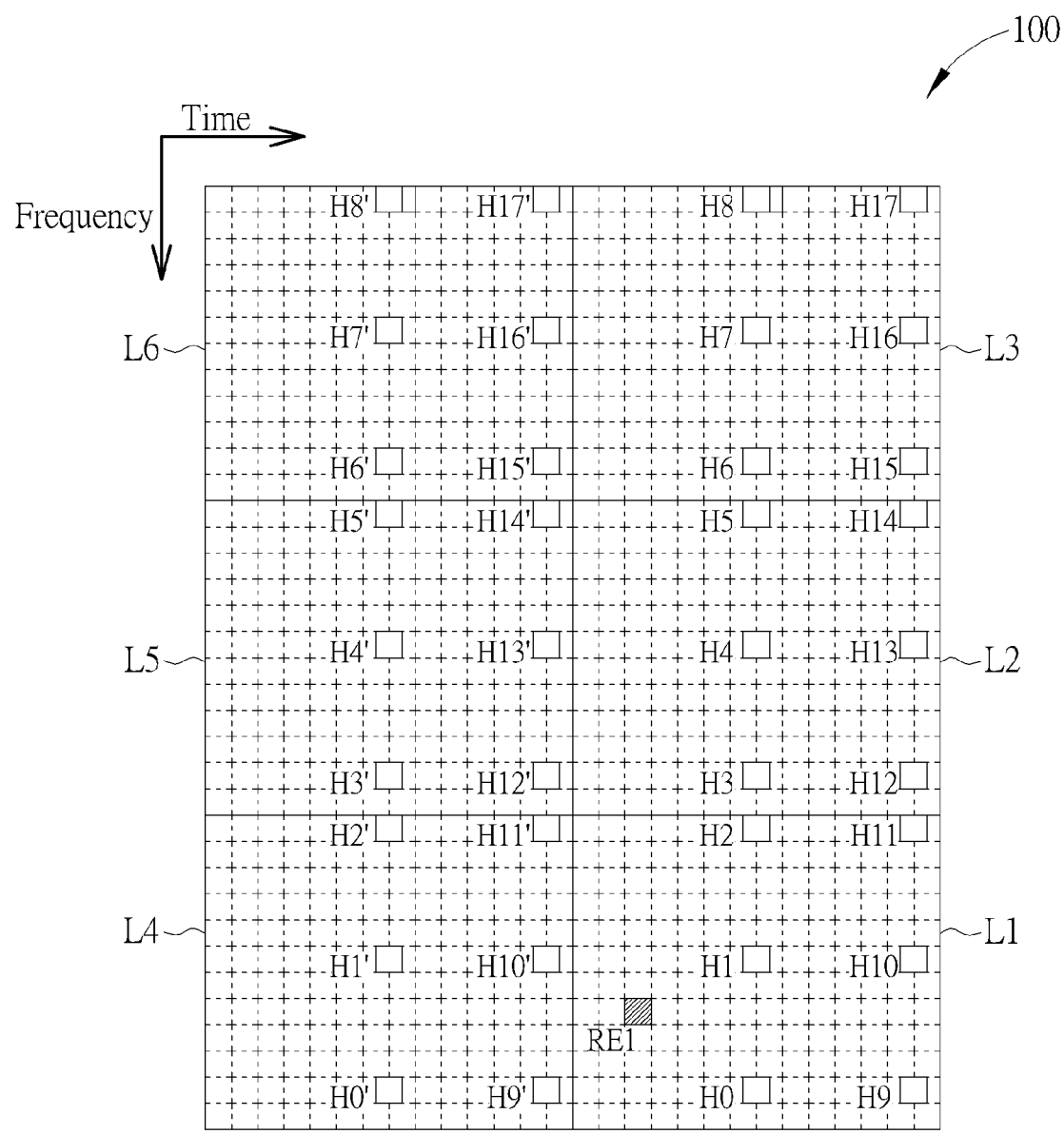
FIG. 1 is a diagram illustrating a time-frequency domain.
Figure 2:
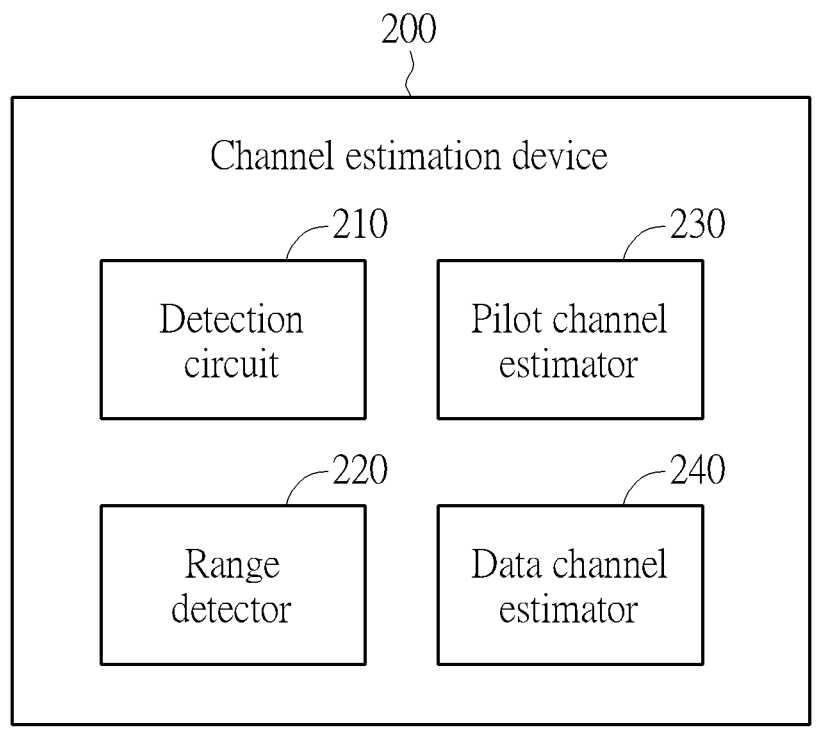
FIG. 2 is a diagram illustrating a channel estimation device arranged for estimating a data channel of a data resource element.
Figure 3:
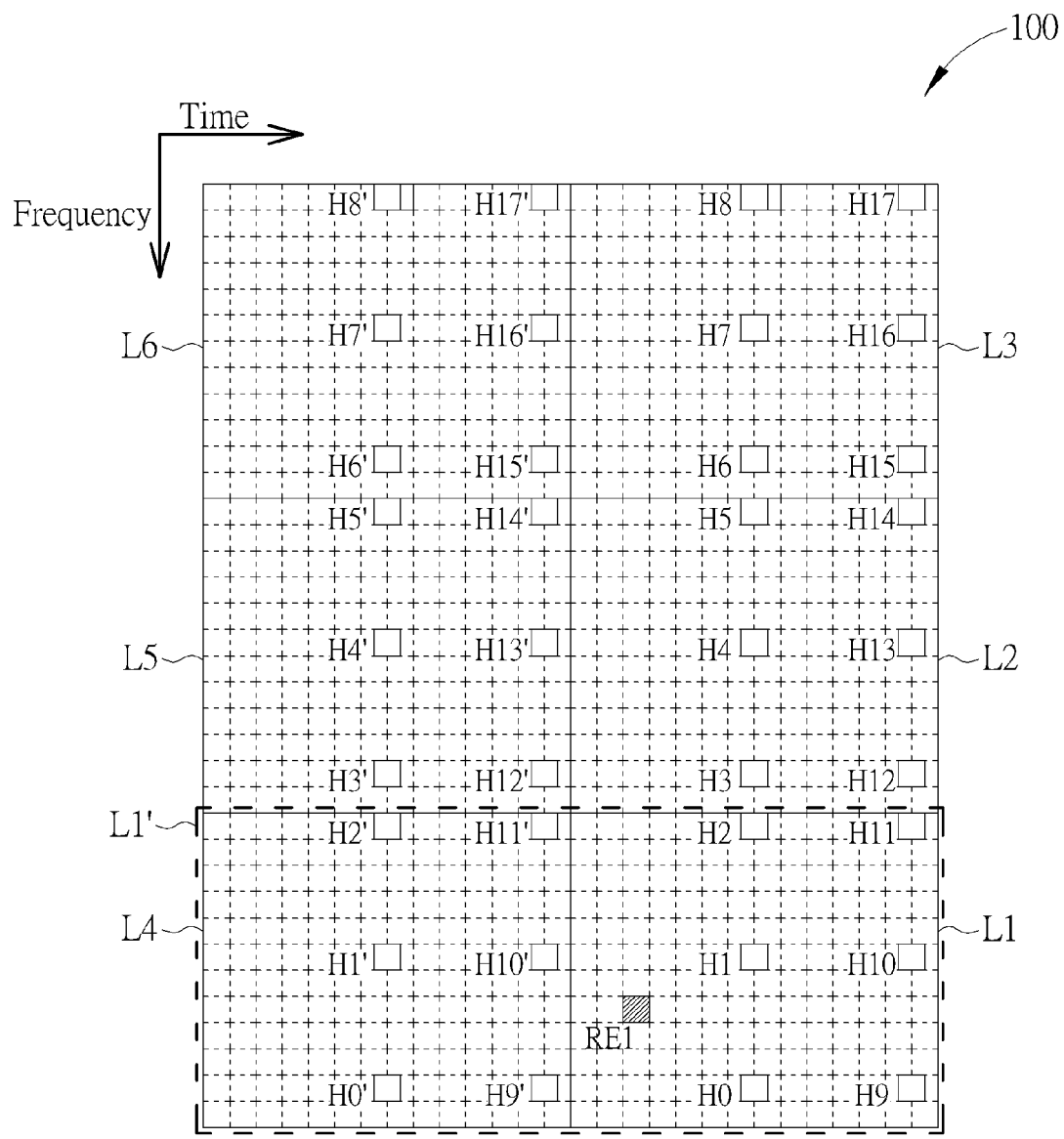
FIGS. 3-6 show various possible PRB processing ranges.
Figure 4:
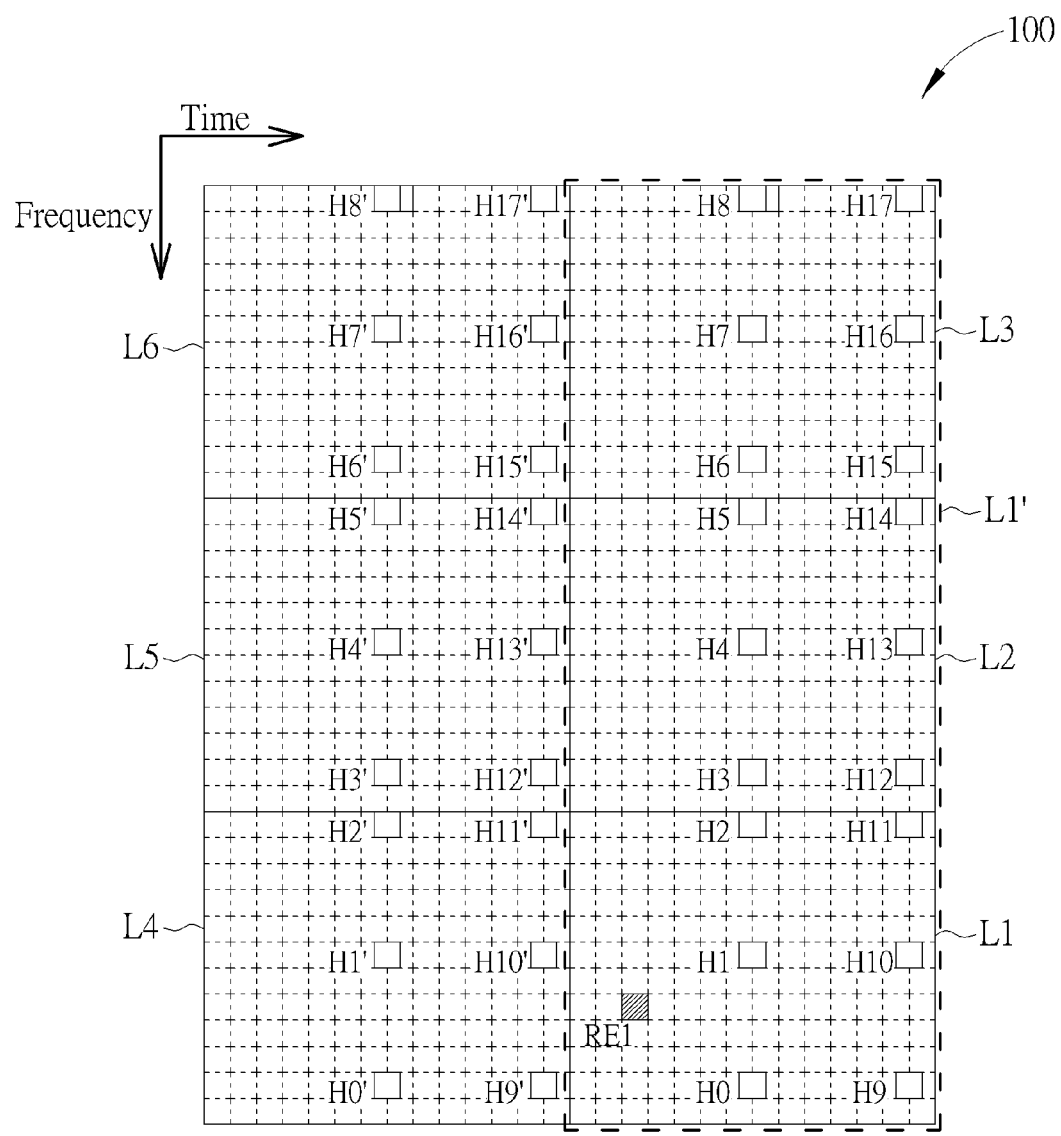
Figure 5:
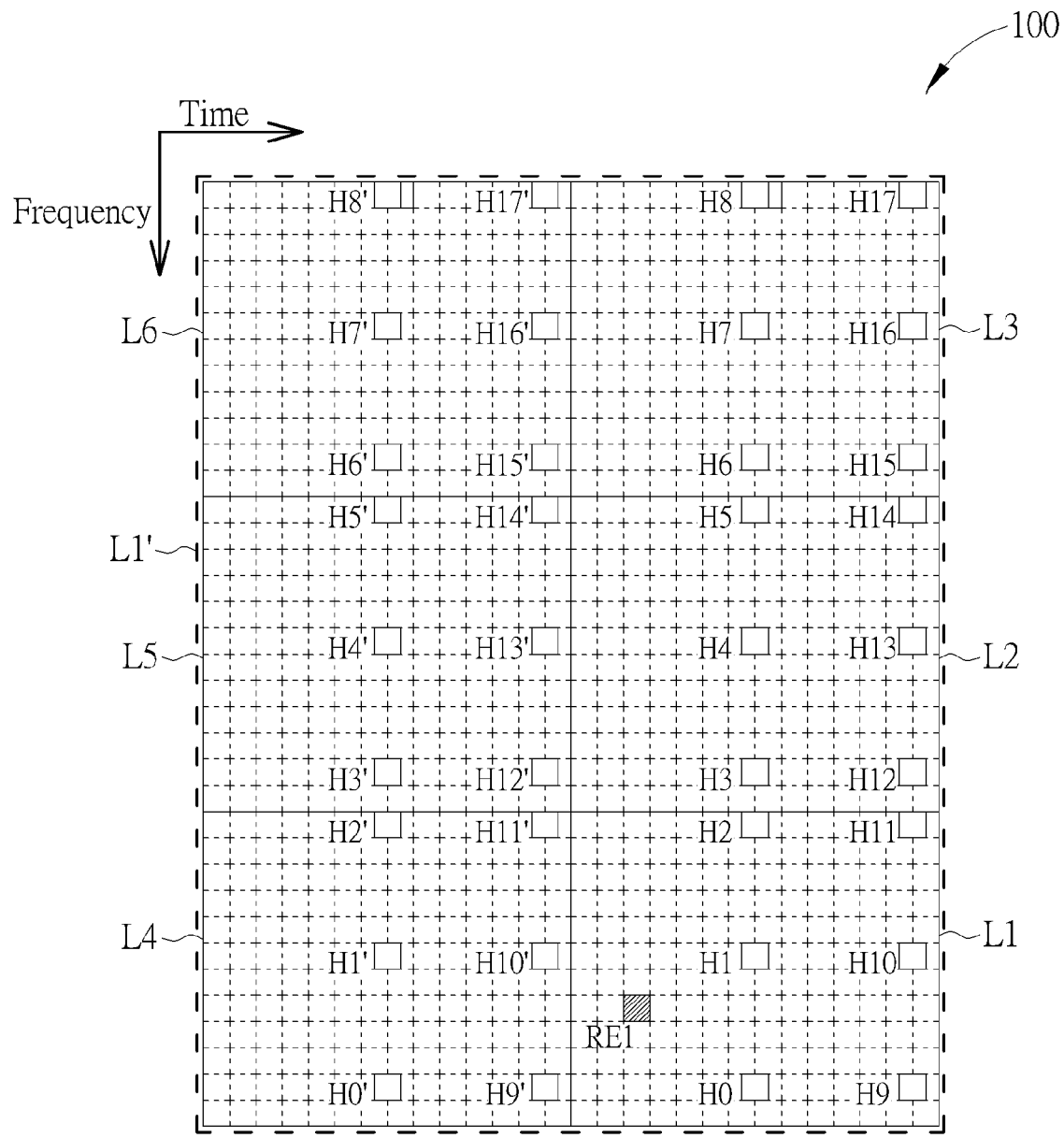

Please refer to FIGS. 1-2. FIG. 1 is a diagram illustrating a time-frequency domain 100. FIG. 2 is a diagram illustrating a channel estimation device 200 arranged for estimating a data channel of a data resource element.

As shown in FIG. 1, the x-axis of the time-frequency domain 100 represents the time domain, and the y-axis of the time-frequency domain 100 represents the frequency domain, wherein the time-frequency domain 100 is arranged in a non-staggered manner. All pilot resource elements are aligned in both the time direction and the frequency direction. The time-frequency domain 100 includes a plurality of physical resource blocks (PRBs) L1-L6. Each of the PRBs L1-L6 includes a plurality of pilot resource elements. For example, the PRB L1 includes a plurality of pilot resource elements H0, H1, H2, H9, H10 and H11, the PRB L2 includes a plurality of pilot resource elements H3, H4, H5, H12, H13 and H14, and the PRB L3 includes a plurality of pilot resource elements H6, H7, H8, H15, H16 and H17. The above is merely for illustrative purposes, and not meant to be a limitation of the present invention. The number of PRBs and pilot resource elements are not limited by FIG. 1, and the present invention is not limited to be performed for the non-staggered pattern only.

According to the 3GPP specification, pilot resource elements of different PRBs can be bundled together to jointly perform channel estimation so as to improve the estimation quality. A plurality of (e.g. two or more) neighboring PRBs may be jointly used to estimate the channels for a data resource element if they are correlated. For example, if more useful pilot resource elements are available, the accuracy of the channel estimation for the data resource element RE1 is more likely to be increased. Since the bundling information may not be available at the receiver such as a user equipment (UE), however, it is very important to know if there are other pilot resource elements that may be helpful for estimating the data resource element.

As shown in FIG. 2, the channel estimation device 200 is used for estimating data channels of a data resource element RE1 of the PRB L1 in the time-frequency domain. The channel estimation device 200 includes a detection circuit 210, a range detector 220, a pilot channel estimator 230 and a data channel estimator 240. The detection circuit 210 is arranged to perform a first PRB bundling detection in a first direction of the time-frequency domain 100 to detect if at least one neighboring PRB is allowed to be bundled with the target PRB which includes the data resource element RE1, and accordingly generate a first PRB bundling detection result, wherein the first direction can be the frequency or time direction of the time-frequency domain 100. For example, if the first direction is the time direction, the PRB L4 will be detected; and if the first direction is the frequency direction, the PRB L2 and L3 will be detected.

The aforementioned detection can be performed in both the time direction and the frequency direction. For example, the detection circuit 210 may further perform a second PRB bundling detection in a second direction of the time-frequency domain to detect if at least one neighboring PRB is allowed to be bundled with the PRB L1, and accordingly generate a second PRB bundling detection result. If the first and second directions are the time and frequency directions, respectively, the PRBs L2-L6 will all be detected.

The range detector 220 is arranged to determine a PRB processing range according to at least the first PRB bundling detection result, wherein at least the PRB is included in the PRB processing range. The range detector 220 can be arranged to determine a PRB processing range according to both the first PRB bundling detection result and the second PRB bundling detection result. In other words, the PRB processing range detection can be two-dimensional.

Figure 6:
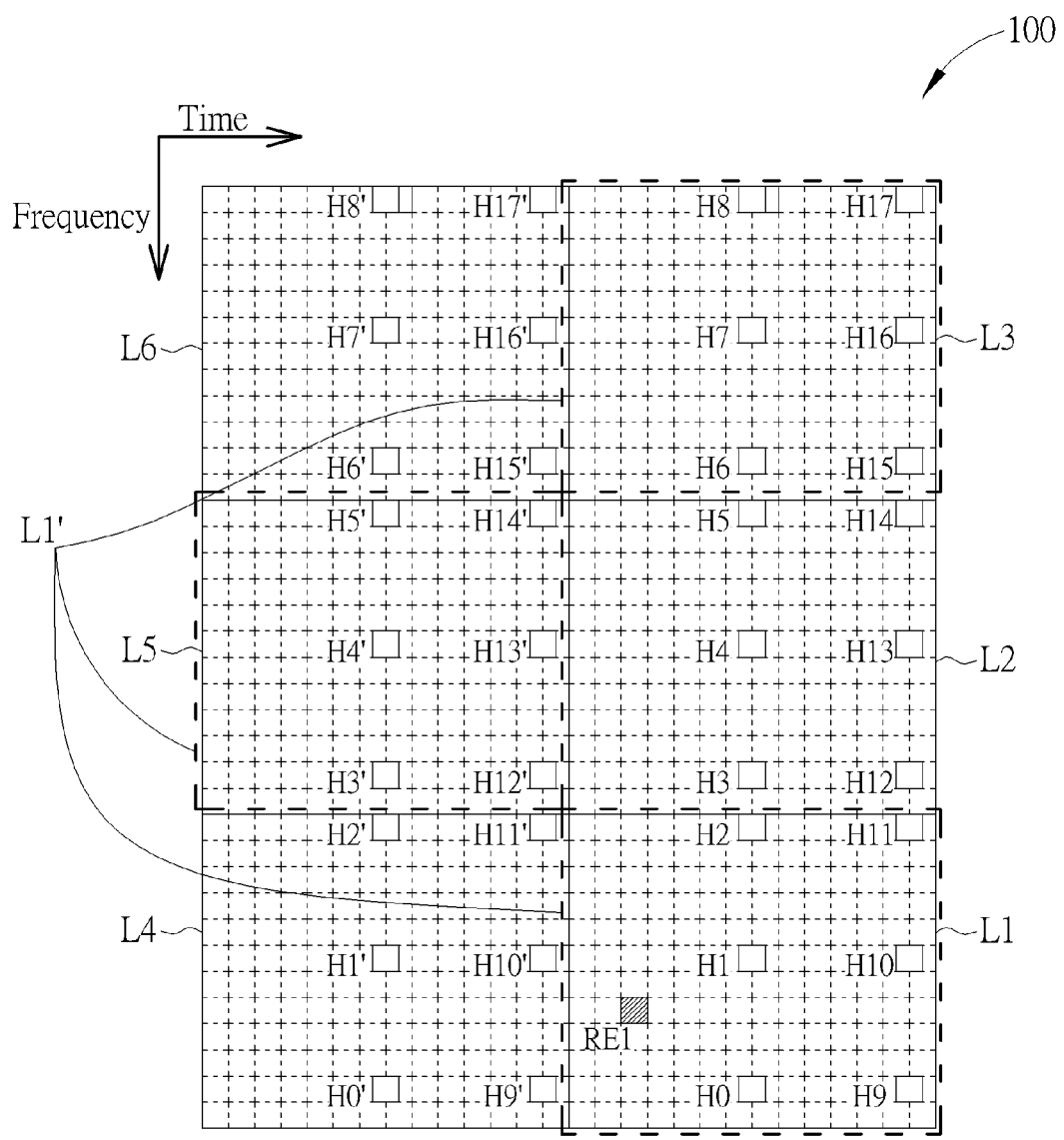

FIGS. 3-6 show various possible PRB processing ranges L1'. The above PRB processing ranges L1' are merely illustrated as examples, and are not meant to be limitations of the present invention. Although the PRB processing range L1' may include a plurality of PRBs, those PRBs are not necessarily adjacent to each other. As shown in FIG. 6, the determined PRB processing range consists of the PRBs L1, L3 and L5, wherein the PRBs L1, L3 and L5 are not adjacent to each other.

Figure 7:
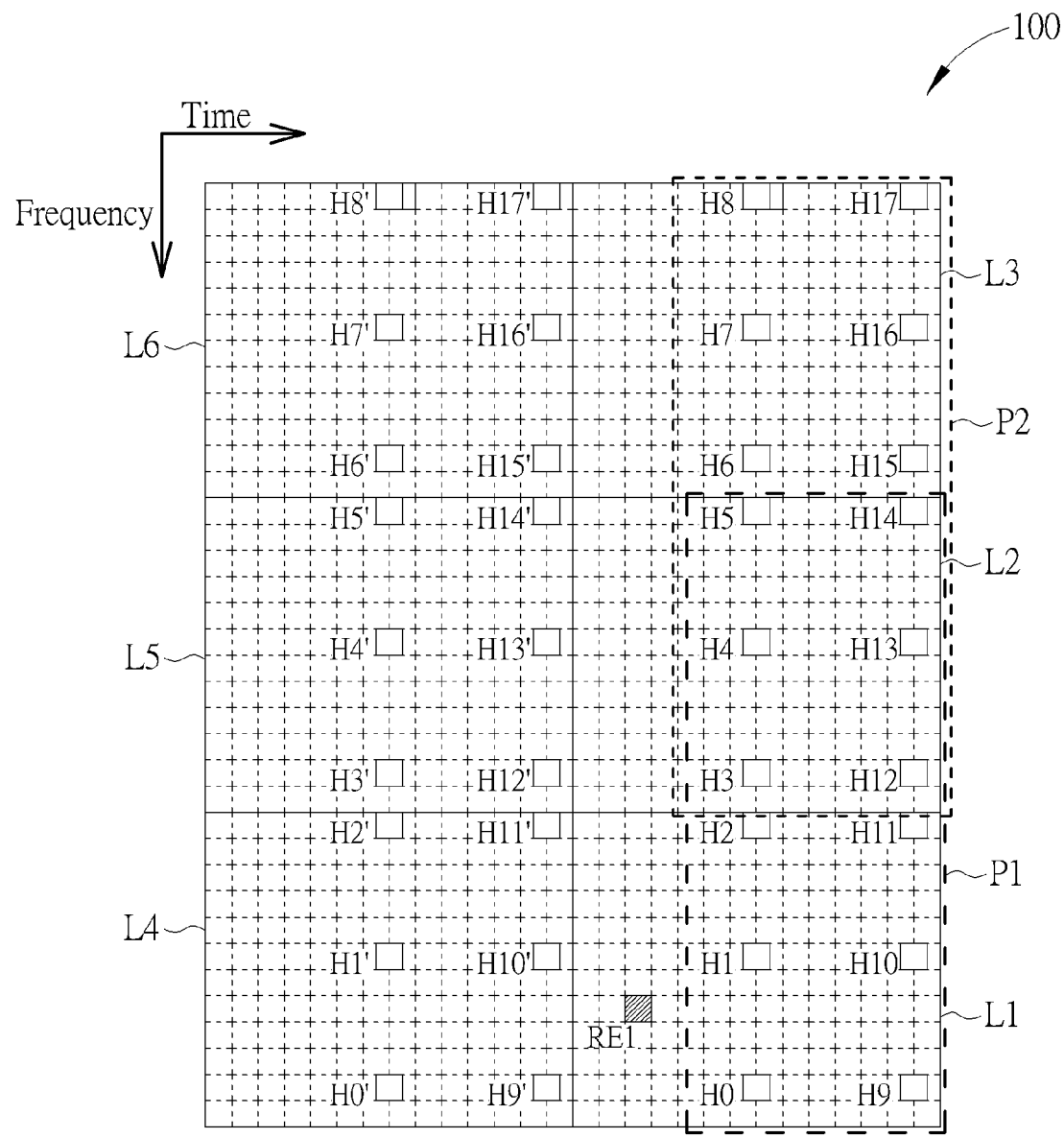
FIG. 7 is a diagram illustrating a scenario of checking PRB bundling of the time-frequency domain shown in FIG. 1.

Please refer to FIG. 7, which is a diagram illustrating a scenario of checking the PRB bundling of the time-frequency domain 100 shown in FIG. 1. As shown in FIG. 7, each neighboring PRB pair can be checked to determine whether they are bundled together. For example, the PRB pair P1 including pilot resource elements of the neighboring PRBs L1 and L2 and the PRB pair P2 including pilot resource elements of the neighboring PRBs L2 and L3 may be checked. If both the PRB pairs P1 and P2 are bundled together, the PRB processing range is determined to include all the PRBs L1-L3. The detection circuit 210 may be utilized to obtain PRB bundling reference information, and then compare the PRB and the at least one neighboring PRB with the PRB bundling reference information, to determine whether the at least one neighboring PRB is bundled with the PRB. Please note that, the above is for illustrative purposes, the present invention does not limit the ways to determine the bundling situations between PRBs.

After the PRB bundling detection result (e.g. the first and/or second PRB bundling detection result) indicates that the at least one neighboring PRB (e.g. some of the PRBs L2-L6) is allowed to be bundled with the target PRB (e.g. the PRB L1), the PRB processing range is set to include the at least one neighboring PRB (e.g. some of the PRBs L2-L6). In some cases, there is no neighboring PRB which is allowed to be bundled with the target PRB. In this case, the PRB processing range will be determined to include the PRB L1 only.

The above implementation of determining the PRB processing range is merely an example, and the present invention does not limit the ways of determining the PRB processing range. Any way of determining the PRB processing range for obtaining more useful pilot resource elements falls within the claimed scope of the present invention.

After the PRB processing range is set, the pilot channel estimator 230 is arranged to obtain a plurality of pilot channels for pilot resource elements in the PRB processing range. For example, if the PRB processing range L1' is set to include the PRBs L1-L6, the pilot channel estimator 230 is arranged to obtain a plurality of pilot channels for pilot resource elements H0-H17 and H0'-H17' in the PRB processing range L1'. In this way, the data resource element RE1 may be estimated.

The data channel estimator 240 is arranged to estimate the data channel of the data resource element RE1 according to the chosen pilot channels (e.g. the aforementioned chosen pilot resource elements H0-H17 and H0'-H17').

Figure 8:
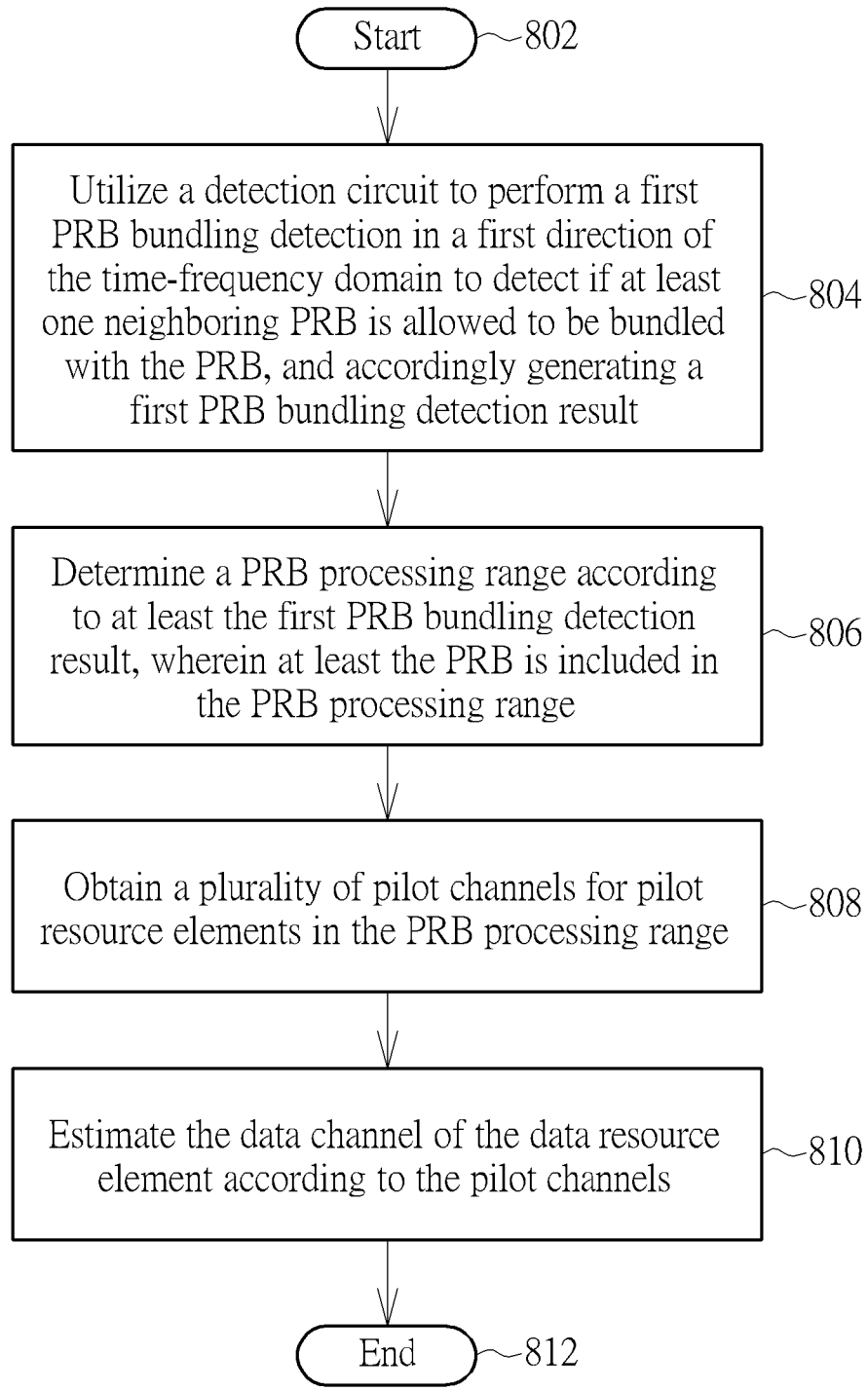
FIG. 8 is a flowchart illustrating a channel estimation method for estimating a data channel of a data resource element of a PRB in a time-frequency domain according to an embodiment of the present invention.

Please refer to FIG. 8, which is a flowchart illustrating a channel estimation method for estimating a data channel of a data resource element of a PRB in a time-frequency domain according to an embodiment of the present invention. Please note that, if the result is substantially the same, the steps are not required to be executed in the exact order shown in FIG. 8. The flowchart can be briefly summarized as follows.

Step 802: Start.

Step 804: Utilize a detection circuit to perform a first PRB bundling detection in a first direction of the time-frequency domain to detect if at least one neighboring PRB is allowed to be bundled with the PRB, and accordingly generate a first PRB bundling detection result.

Step 806: Determine a PRB processing range according to at least the first PRB bundling detection result, wherein at least the PRB is included in the PRB processing range.

Step 808: Obtain a plurality of pilot channels for pilot resource elements in the PRB processing range.

Step 810: Estimate the data channel of the data resource element according to the pilot channels.

Step 812: End.

As one skilled in the art can readily understand details of each step shown in FIG. 8 after reading the above paragraphs directed to the channel estimation device 200, further description is omitted here for brevity.

To summarize, the present invention is capable of optimizing the performance of estimating a data channel of a data resource element. More particularly, even if the PRB bundling information is unknown at the receiver, the present invention is capable of obtaining useful pilot resource elements of PRBs which neighbor the target PRB including the data resource element, so that the data channel of the data resource element may be estimated with the pilot resource elements of the target PRB and the neighboring PRBs. The performance of estimating the data resource elements may thereby be improved even if the PRB bundling information is unknown at the receiver.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A channel estimation method for estimating a data channel of a data resource element of a physical resource block (PRB) in a time-frequency domain, comprising:
    utilizing a detection circuit to perform a first PRB bundling detection in a first direction of the time-frequency domain to detect if at least one neighboring PRB is allowed to be bundled with the PRB, and accordingly generating a first PRB bundling detection result;
    determining a PRB processing range according to at least the first PRB bundling detection result, wherein the PRB processing range comprises a plurality of PRBs, and at least the PRB is included in the PRB processing range; and when the first PRB bundling detection result indicates that the at least one neighboring PRB is allowed to be bundled with the PRB, the at least one neighboring PRB is included in the PRB processing range, and when the first PRB bundling detection result indicates that the at least one neighboring PRB is not allowed to be bundled with the PRB, the at least one neighboring PRB is not included in the PRB processing range;
    obtaining a plurality of pilot channels for pilot resource elements in the PRB processing range; and
    estimating the data channel of the data resource element according to the pilot channels;
    wherein the first PRB bundling detection to detect if the at least one neighboring PRB is allowed to be bundled with the PRB comprises:
    obtaining PRB bundling reference information from the detection circuit; and
    comparing the PRB and the at least one neighboring PRB with the PRB bundling reference information, to determine whether the at least one neighboring PRB is bundled with the PRB.

2. The channel estimation method of claim 1, wherein the first direction is a frequency direction of the time-frequency domain.

3. The channel estimation method of claim 1, wherein the first direction is a time direction of the time-frequency domain.

4. The channel estimation method of claim 1, further comprising:
    performing a second PRB bundling detection in a second direction of the time-frequency domain to detect if at least one neighboring PRB is allowed to be bundled with the PRB, and accordingly generating a second PRB bundling detection result;
    wherein the step of determining the PRB processing range comprises:
    determining the PRB processing range according to the first PRB bundling detection result and the second PRB bundling detection result.

5. The channel estimation method of claim 4, wherein one of the first direction and the second direction is a time direction of the time-frequency domain, and the other of the first direction and the second direction is a frequency direction of the time-frequency domain.

6. A channel estimation device for estimating a data channel of a data resource element of a physical resource block (PRB) in a time-frequency domain, comprising:
    a detection circuit, arranged to perform a first PRB bundling detection in a first direction of the time-frequency domain to detect if at least one neighboring PRB is allowed to be bundled with the PRB, and accordingly generate a first PRB bundling detection result;
    a range detector, arranged to determine a PRB processing range according to at least the first PRB bundling detection result, wherein the PRB processing range comprises a plurality of PRBs, and at least the PRB is included in the PRB processing range; and when the first PRB bundling detection result indicates that the at least one neighboring PRB is allowed to be bundled with the PRB, the at least one neighboring PRB is included in the PRB processing range, and when the first PRB bundling detection result indicates that the at least one neighboring PRB is not allowed to be bundled with the PRB, the at least one neighboring PRB is not included in the PRB processing range;
    a pilot channel estimator, arranged to obtain a plurality of pilot channels for pilot resource elements in the PRB processing range; and
    a data channel estimator, arranged to estimate the data channel of the data resource element according to the pilot channels;
    wherein the first PRB bundling detection to detect if the at least one neighboring PRB is allowed to be bundled with the PRB comprises obtaining PRB bundling reference information from the detection circuit; and the detection circuit compares the PRB and the at least one neighboring PRB with the PRB bundling reference information, to determine whether the at least one neighboring PRB is bundled with the PRB.

7. The channel estimation device of claim 6, wherein the first direction is a frequency direction of the time-frequency domain.

8. The channel estimation device of claim 6, wherein the first direction is a time direction of the time-frequency domain.

9. The channel estimation device of claim 6, wherein the detection circuit further performs a second PRB bundling detection in a second direction of the time-frequency domain to detect if at least one neighboring PRB is allowed to be bundled with the PRB, and accordingly generate a second PRB bundling detection result; and the range detector determines the PRB processing range according to the first PRB bundling detection result and the second PRB bundling detection result.

10. The channel estimation device of claim 9, wherein one of the first direction and the second direction is a time direction of the time-frequency domain, and the other of the first direction and the second direction is a frequency direction of the time-frequency domain.

* * * * *